(12) United States Patent
Nakabayashi et al.

(10) Patent No.: US 7,636,439 B2
(45) Date of Patent: Dec. 22, 2009

(54) ENCRYPTION METHOD, ENCRYPTION APPARATUS, DATA STORAGE DISTRIBUTION APPARATUS AND DATA DELIVERY SYSTEM

(75) Inventors: Sumie Nakabayashi, Kokubunji (JP);
Kazuhito Yaegashi, Kodaira (JP);
Munemitsu Kuwabara, Kodaira (JP);
Hirotake Usami, Tachikawa (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 846 days.

(21) Appl. No.: 11/221,769

(22) Filed: Sep. 9, 2005

(65) Prior Publication Data
US 2006/0056625 A1   Mar. 16, 2006

(30) Foreign Application Priority Data
Sep. 10, 2004   (JP)   ............... 2004-264611

(51) Int. Cl.
*H04L 9/00* (2006.01)
*G06F 11/30* (2006.01)
*H04L 9/32* (2006.01)
(52) U.S. Cl. ............... 380/46; 380/44; 380/45; 380/47; 713/189; 713/190; 713/191; 713/192; 713/193; 726/27; 726/28; 726/29; 726/30

(58) Field of Classification Search .............. 380/46
See application file for complete search history.

(56) References Cited

FOREIGN PATENT DOCUMENTS

| JP | 2002202719 | 7/2002 |
|----|------------|--------|
| JP | 2003134106 | 5/2003 |
| JP | 2003196491 | 7/2003 |

OTHER PUBLICATIONS

"Request for Comments: 3711, Mar. 2004. M. Baugher, et al." The Secure Real-time Transport Protocol (SRTP).pp. 1-56.
E. Okamoto, "Introduction of Cryptographic Theory", Kyoritsu Shuppan Col., Ltd., 1993, pp. 45-46.

*Primary Examiner*—Longbit Chai
(74) *Attorney, Agent, or Firm*—Brundidge & Stanger, P.C.

(57) ABSTRACT

Data to be encrypted is effectively encrypted by a data delivery system for encrypting the data to be encrypted with a transmitting apparatus and decrypting a cipher thereof with a receiving apparatus. In a configuration for encrypting and decrypting the data to be encrypted by using a random number sequence generated by a random number generating portion for generating the random number sequence uniquely decided from an input parameter, the transmitting apparatus generates the input parameter to perform encryption based on metadata of the data to be encrypted while the receiving apparatus generates the input parameter to perform cipher decryption based on the metadata embedded in the data to be encrypted.

12 Claims, 11 Drawing Sheets

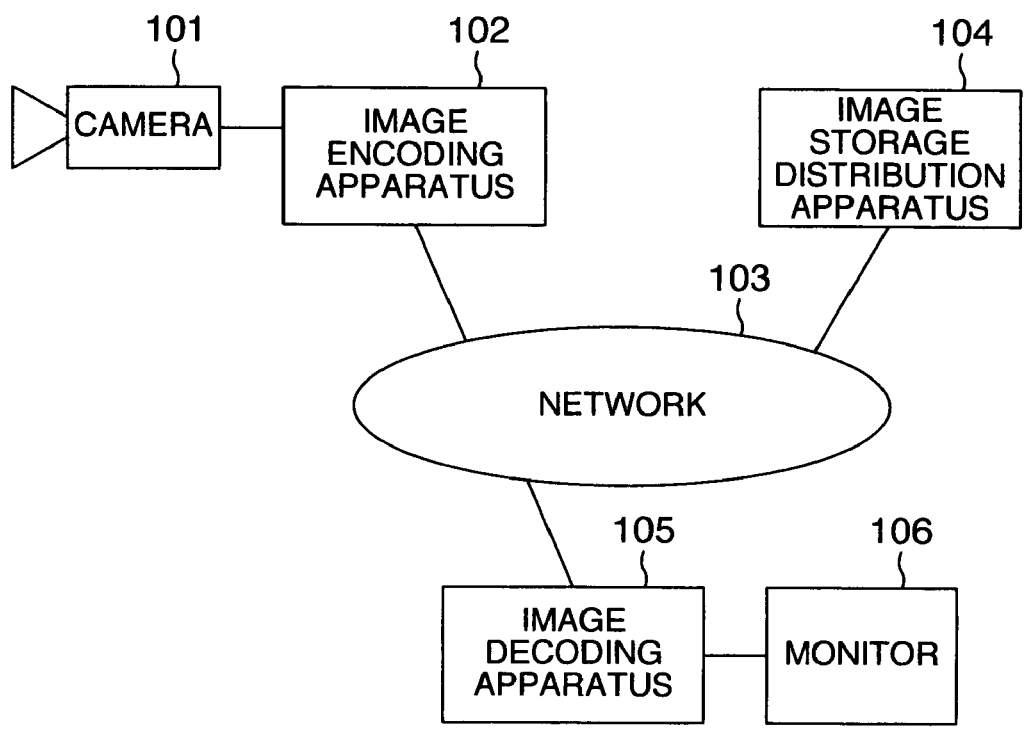
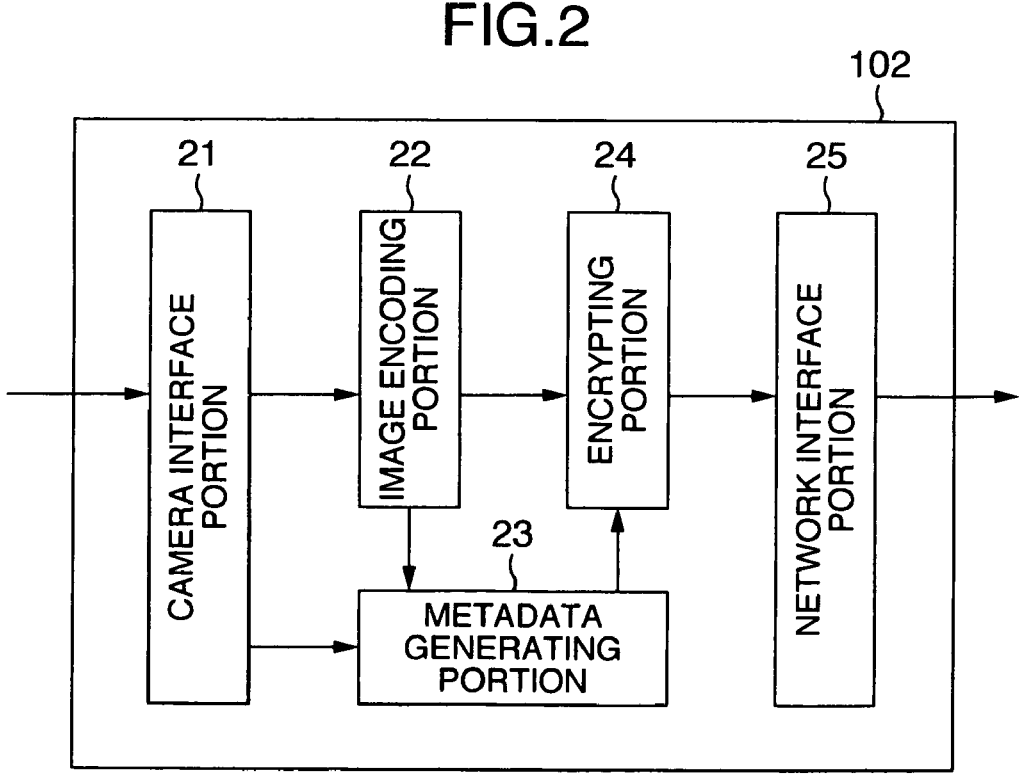

FIG.11A

| SOI | APP0 | ADDITIONAL INFORMATION | SOF0 | ADDITIONAL INFORMATION | SOS | ADDITIONAL INFORMATION | ENCODING SEGMENT | EOI |

FIG.11B

| SOI | APP0 | ADDITIONAL INFORMATION | SOF0 | ADDITIONAL INFORMATION | SOS | ADDITIONAL INFORMATION | ENCODING SEGMENT | EOI |

← ENCRYPTION

FIG.11C

| SOI | APP0 | ADDITIONAL INFORMATION | SOF0 | ADDITIONAL INFORMATION | SOS | ADDITIONAL INFORMATION | ENCODING SEGMENT | EOI |

← METADATA EMBEDDING

← ENCRYPTION

ENCRYPTION METHOD, ENCRYPTION APPARATUS, DATA STORAGE DISTRIBUTION APPARATUS AND DATA DELIVERY SYSTEM

INCORPORATION BY REFERENCE

The present application insists on priority of Japanese Patent Application No. 2004-264611 filed on Sep. 10, 2004, and incorporates it into the present application by referring to the contents thereof.

BACKGROUND OF THE INVENTION

The present invention relates to an encryption method and a data delivery system for encrypting data to be encrypted, and in particular, to the encryption method and data delivery system capable of effectively encrypting the data to be encrypted.

As for a monitoring system for a security purpose, it is becoming essential, for instance, to construct a system using a network such as the internet in terms of cost-competitiveness and differentiation from a conventional system. In the case of an open network such as the internet, dangers of eavesdropping, data tampering and so on are increasing.

Here, cryptography and message authentication are known as countermeasure technologies against the eavesdropping and data tampering on the network. For instance, the RFC (Request for Comments) 3711 which is a standard of the technologies relating to the internet introduces RTP (Real-time Transport Protocol) packet cryptography and message authentication technologies.

SUMMARY OF THE INVENTION

There are the following problems, however, in the case of applying a cryptography technology to a system for storing an image taken by a surveillance camera in a server via the internet, distributing it to a client as required and performing monitoring and so on on the client for instance.

The first problem is cryptographic synchronization on a packet loss. In the case of encrypting the contents such as the image, a stream cipher method of which processing is fast is often used.

As for the stream cipher method of an external synchronous cipher for instance, a transmitting end generates a ciphertext from an exclusive OR of a keystream generated by a random number generator and a plaintext so as to deliver the ciphertext to a receiving end via a network. The receiving end returns the ciphertext to the plaintext from the exclusive OR of the keystream generated by the random number generator and the received ciphertext.

Therefore, there is a problem that, in the case of absence of a part of the ciphertext, the random number generators of the transmitting end and receiving end go out of synchronization so that the receiving end can no longer decrypt the ciphertext. As for a countermeasure against it, a method of initializing the random number generators in units of a packet is generally performed.

Here, in the case of an encryption scheme for generating the keystream by means of the random number generator with an encryption key and an initialization vector as inputs and performing encryption by using the keystream, the generated keystream is uniquely decided by a combination of the encryption key and initialization vector.

In the case of such an encryption scheme, even if the random number generator is initialized in units of a packet, the same keystream as the one applied to a foregoing packet is generated to compromise security of the cipher unless the encryption key or the initialization vector is changed.

The RFC 3711 which is a conventional technology derives the initialization vector from a sequence number of an RTP packet header and updates the initialization vector for each packet to avoid reuse of the same keystream. As the sequence number of RTP is 16 bits, it is recommended to provide a 32 bits rollover counter and derive different initialization vectors up to 2-to-the-$48^{th}$-power packets so as to update the encryption key before transmitting the 2-to-the-$48^{th}$-power packets.

The second problem relates to key management of a system. The system for performing the encryption has the problem that the key management becomes complicated including setup of the encryption key and distribution of the encryption key in conjunction with updating of the encryption key among an image encoding apparatus, image storage distribution apparatus and an image decoding apparatus and the problem that a load of the key management becomes heavier for a user.

The present invention has been made in view of such conventional circumstances, and an object thereof is to provide the encryption method and data delivery system capable of effectively encrypting the data to be encrypted.

To attain the object, the encryption method according to the present invention is the one for encrypting the data to be encrypted by using a random number sequence generated by a random number generating portion for generating the random number sequence uniquely decided from an input parameter, wherein the encryption method is implemented based on metadata of the data to be encrypted.

Here, various data may be used as the data to be encrypted. Likewise, various data may be used as the metadata.

In the case of embedding the metadata in the data to be encrypted and decrypting the encrypted data to be encrypted by the encryption method according to the present invention, the input parameter is generated based on the embedded metadata.

The encryption method according to the present invention encrypts the data on the portions except a header and the metadata of the data to be encrypted.

The encryption method according to the present invention updates the input parameter and initializes the random number generating portion per unit or multiple units of the data to be encrypted.

According to the encryption method of the present invention, the input parameter consists of the initialization vector and encryption key, and the initialization vector is generated based on the metadata. The encryption key does not have to be updated from the one set in advance.

A method of searching the data encrypted by the encryption method according to the present invention searches for the encrypted data based on the embedded metadata.

To attain the object, the data delivery system according to the present invention is the one for encrypting the data to be encrypted with a transmitting apparatus and decrypting it with a receiving apparatus, wherein:

the transmitting apparatus comprises: a random number generating portion for generating the random number sequence uniquely decided from an input parameter; an input parameter generating portion for generating the input parameter based on metadata of the data to be encrypted; a metadata embedding portion for embedding the metadata in the data to be encrypted or the encrypted data to be encrypted; and an encrypting portion for encrypting a data body except a header and the metadata of the data to be encrypted by using the random number sequence generated by the random number generating portion, and the receiving apparatus comprises: the random number generating portion; a metadata extracting portion for extracting the metadata from the encrypted data to be encrypted; an input parameter generating portion for generating the input parameter based on the metadata extracted by the metadata extracting portion; and a cipher decrypting portion for decrypting the data body except the header and the metadata of the encrypted data to be encrypted by using the random number sequence generated by the random number generating portion.

The data delivery system according to the present invention updates the input parameter and initializes the random number generating portion per unit or multiple units of the data to be encrypted.

As described above, the encryption method and data delivery system according to the present invention can effectively encrypt the data to be encrypted because the input parameter is generated based on the metadata of the data to be encrypted when encrypting the data to be encrypted by using the random number sequence generated by the random number generating portion for generating the random number sequence uniquely decided from the input parameter.

Hereunder, the embodiments of the present invention will be described by referring to the drawings. Other objects, characteristics and advantages of the present invention will be clarified by the following descriptions of the embodiments of the present invention relating to the attached drawings.

BRIEF DESCRIPTION OF THE DRAWINGS

FIG. 1 is a diagram showing a configuration example of an image delivery system according to an embodiment of the present invention;

FIG. 2 is a diagram showing a configuration example of an image encoding apparatus according to an embodiment of the present invention;

FIG. 11A is a diagram showing an example of the output format of the image encoding portion in a configuration example of the encoded image data according to an embodiment of the present invention;

FIG. 11B is a diagram showing an example of the position for performing encryption in a configuration example of the encoded image data according to an embodiment of the present invention; and FIG. 11C is a diagram showing an example of the position for embedding metadata in a configuration example of the encoded image data according to an embodiment of the present invention.

DETAILED DESCRIPTION OF THE EMBODIMENTS

Figure 3A:
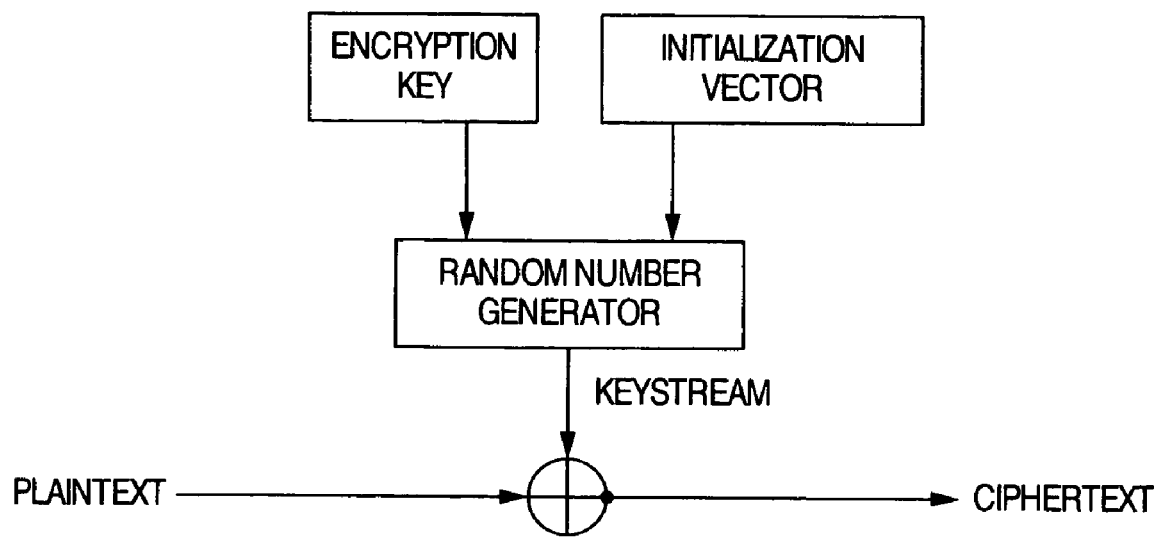
FIG. 3A is a diagram showing a conventional technology of an encryption process.

FIG. 1 shows a configuration example of an image delivery system according to an embodiment of the present invention.

The image delivery system shown in FIG. 1 is configured by a camera 101, an image encoding apparatus 102, an image storage distribution apparatus 104, an image decoding apparatus 105 and a monitor 106. The image encoding apparatus 102, image storage distribution apparatus 104 and image decoding apparatus 105 are connected by a network 103 such as the internet for instance.

Here, the camera 101 is a TV camera of the NTSC method for instance, which takes an image of a predetermined place and outputs a video signal as an input image to the image encoding apparatus 102. The image encoding apparatus 102 compression-encodes the input image from the connected camera 101 by the MPEG (Motion Picture Experts Group) method or the JPEG (Joint Photographic Experts Group) method for instance, and further encrypts encoded image data so as to output the encrypted encoded image data to the network 103.

The image storage distribution apparatus 104 stores the encrypted encoded image data received from the network 103 in a disk device (a random-accessible recording device for storing data) in the apparatus, and further delivers the encrypted encoded image data to the network 103 based on a request from a client (the image decoding apparatus 105) for instance.

On receiving the encrypted encoded image data from the network 103, the image decoding apparatus 105 decrypts a cipher and decodes the image so as to output the decrypted and decoded image data to the monitor 106 connected to the image decoding apparatus 105. The monitor 106 has the decrypted and decoded image displayed or reproduced thereon.

Here, for the sake of simplification, the above-mentioned image delivery system has one each of the camera 101, image encoding apparatus 102, image storage distribution apparatus 104 and image decoding apparatus 105 installed thereon. However, the numbers thereof are arbitrarily selectable.

The above-mentioned image delivery system has a configuration in which the image decoding apparatus 105 receives the encrypted image data from the image storage distribution apparatus 104. It is also possible, as another configuration example, to have the image decoding apparatus 105 receive the encrypted image data directly from the image encoding apparatus 102.

It is also possible to use an apparatus having functions of the camera 101 and image encoding apparatus 102 integrated therein and an apparatus having the functions of the image encoding apparatus 102 and image storage distribution apparatus 104 integrated therein. Thus, the image delivery system is not limited to the above embodiment.

FIG. 2 shows a configuration example of the image encoding apparatus according to an embodiment of the present invention.

The image encoding apparatus 102 shown in FIG. 2 is configured by a camera interface portion 21, an image encoding portion 22, a metadata generating portion 23, an encrypting portion 24 and a network interface portion 25.

The camera interface portion 21 captures the input image from the camera 101 and outputs it to the image encoding portion 22.

The image encoding portion 22 compression-encodes the input image and output the encoded image data to the encrypting portion 24.

The metadata generating portion 23 generates ancillary information (hereafter, referred to as the metadata) on the image data such as an ID number of the camera 101 which is a generation source of the encoded image data, time stamp information on the encoded image data and an image frame number of the encoded image data so as to output it to the encrypting portion 24.

Here, the metadata generating portion 23 creates the metadata based on one or multiple pieces of data. As for the method of generating the metadata, it is possible to use various methods, such as generating the ID number of the camera 101 based on information from the camera interface portion 21, generating a time stamp based on time for having the encoded image data generated by the image encoding portion 22 and generating the image frame number based on information of a counter for counting the image frame numbers provided to the image encoding portion 22 for instance.

As for the metadata, it is possible, for instance, to use the data generated based on alarm information obtained from sensors installed in a shooting area of the camera 101 to detect an abnormality of the shooting area, such as an infrared sensor, an ultrasonic sensor, a smoke sensor and a gas-leak sensor other than the above.

The encrypting portion 24 reads from the metadata generating portion 23 the metadata corresponding to the encoded image data inputted from the image encoding portion 22, generates a keystream used for an encryption process based on the metadata (described in detail later) and encrypts the encoded image data inputted from the image encoding portion 22 by using the generated keystream so as to output the encrypted encoded image data and corresponding metadata to the network interface portion 25.

The network interface portion 25 outputs the encrypted encoded image data and corresponding metadata inputted from the encrypting portion 24 to the network 103.

Next, a description will be given by referring to FIGS. 3A to 6 as to an example of the encryption process performed by the encrypting portion 24 as a characteristic part of the present invention.

Figure 3B:
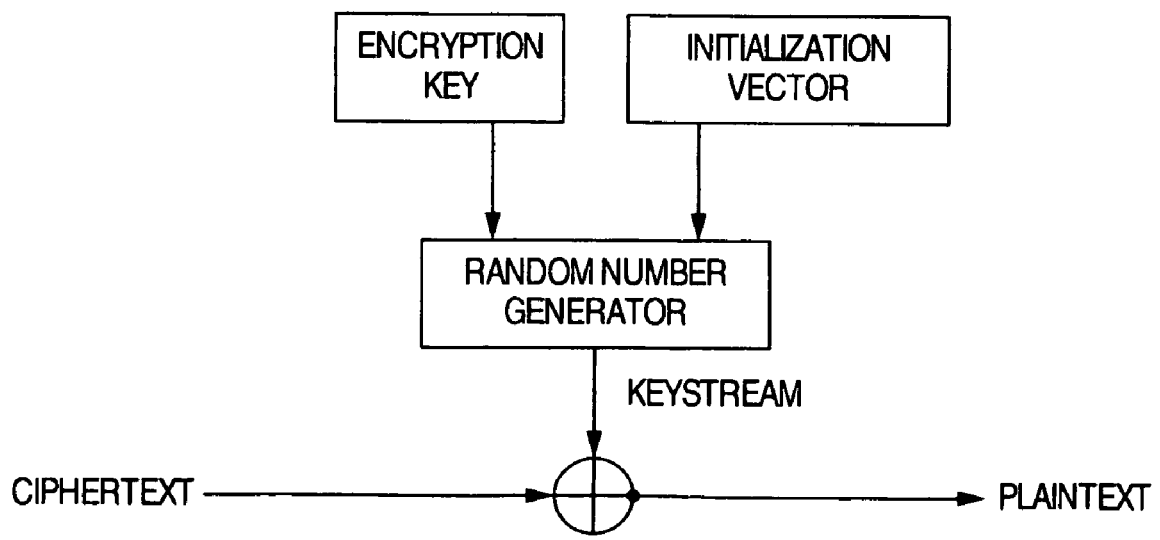
FIG. 3B is a diagram showing a conventional technology of a cipher decryption process.

FIGS. 3A and 3B are diagrams showing conventional technologies of the present invention.

Figure 3C:
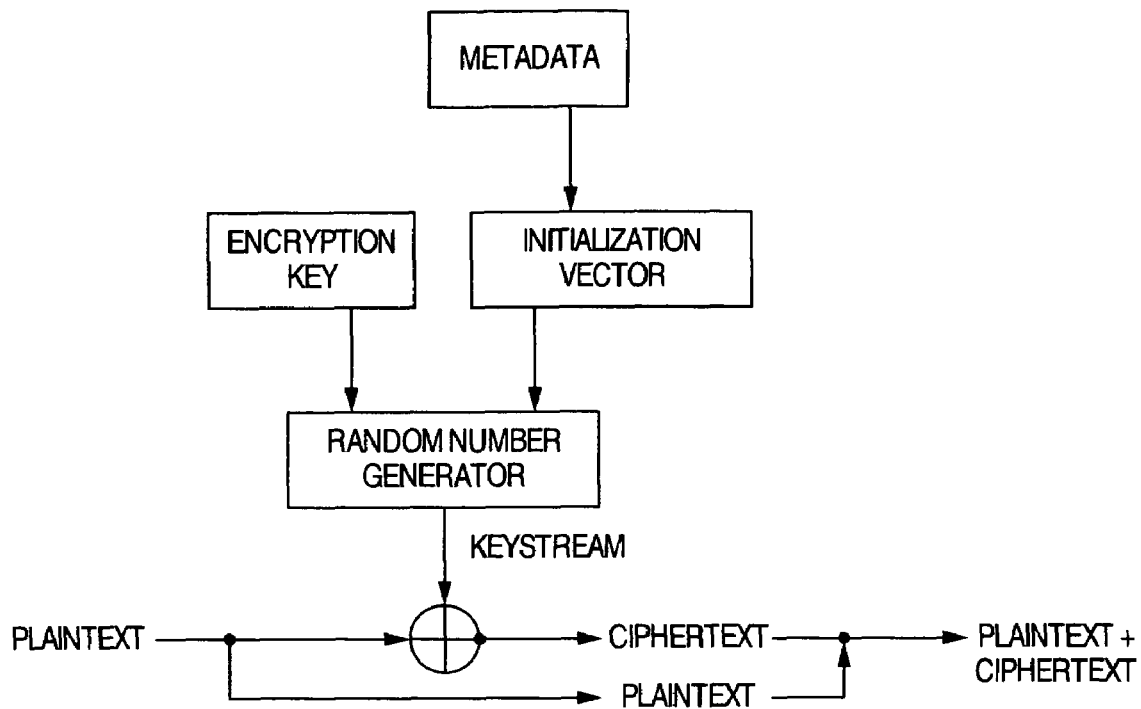
FIG. 3C is a diagram showing a configuration example of the encryption process according to an embodiment of the present invention.
Figure 3D:
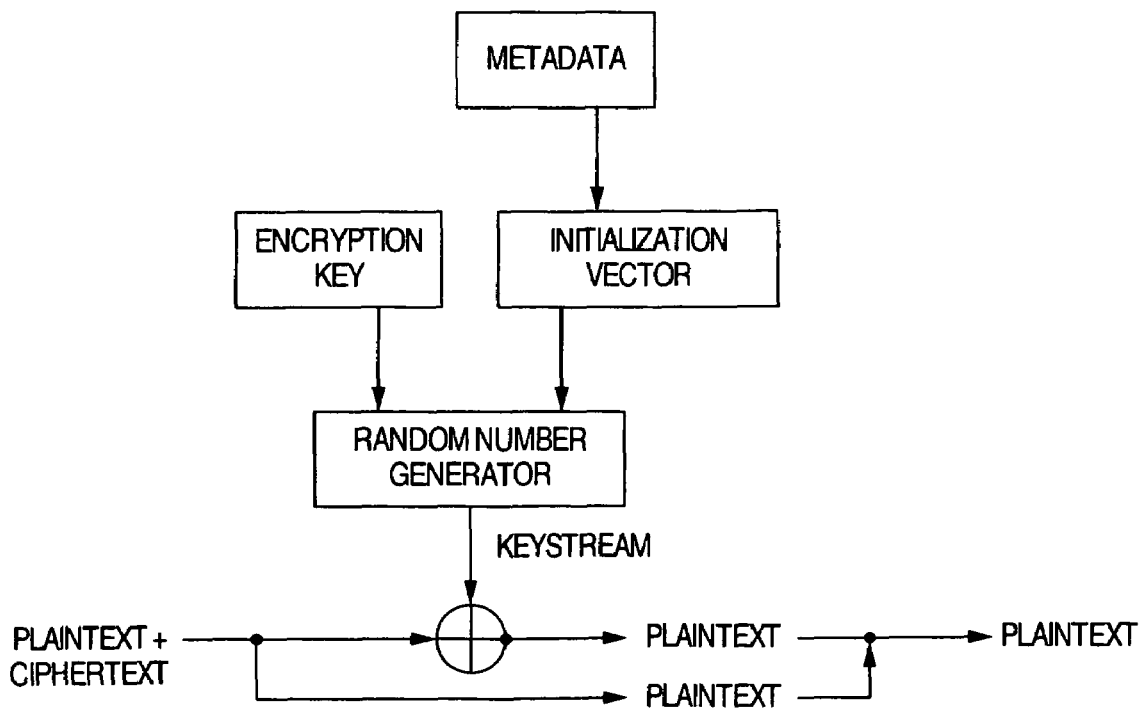
FIG. 3D is a diagram showing a configuration example of the cipher decryption process according to an embodiment of the present invention.

FIG. 3C is a diagram showing an embodiment of the encryption process according to the present invention. FIG. 3D is a diagram showing an embodiment of the cipher decryption process according to the present invention.

As for cryptographic algorithms to be used for encryption of the contents of the image data and voice data, DES (Data Encryption Standard), AES (Advanced Encryption Standard) and so on are known. The encrypting portion 24 of this embodiment will be described as to the case of applying MUGI listed in the e-Government Recommended Ciphers List.

As shown in FIG. 3C, according to this embodiment, a random number generator has an encryption key K (secret key) of 128 bits and an initialization vector I (open parameter) of 128 bits as input terminals. The random number generator initializes an internal state every time the encryption key K and initialization vector I are inputted so as to generate a random number sequence (keystream) while repeating a state transition. And the encryption process for creating a ciphertext is performed by XORing the keystream outputted from the random number generator and a plaintext for each bit.

As will be described later, the encryption process of this embodiment can encrypt a specific data area in one data frame. To be more specific, the encryption process of this embodiment can implement the configuration in which both encryption data (ciphertext) and non-encryption data (plaintext) exist.

To implement the above configuration of the data frame, the configuration shown in FIG. 3C may be used.

It is also possible, though not shown in FIG. 3C, to use a cipher determining portion for identifying the data area to be encrypted and the data area not to be encrypted. The data area determined to require the encryption by the cipher determining portion is XORed with the keystream for each bit and encrypted. The data areas other than the above are not XORed and so not encrypted.

Figure 5A:
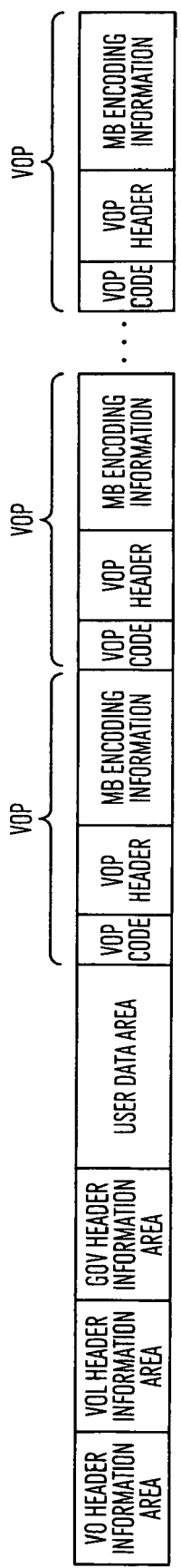
FIG. 5A is a diagram showing an example of an output format of an image encoding portion in a configuration example of encoded image data according to an embodiment of the present invention.
Figure 5B:
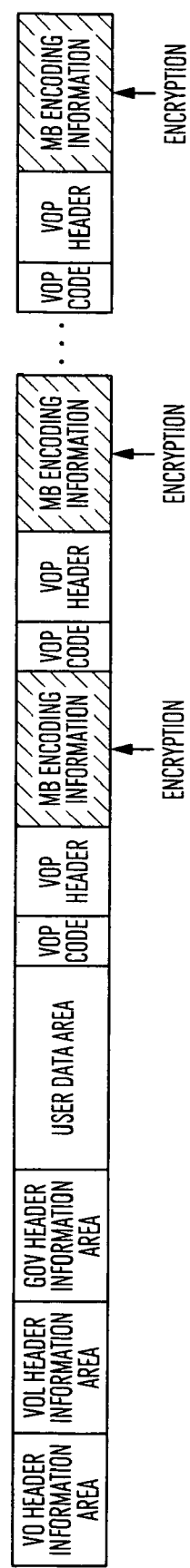
FIG. 5B is a diagram showing an example of a position for performing encryption in a configuration example of encoded image data according to an embodiment of the present invention.

Thus, the configuration of the data frame including the encrypted area as shown in FIG. 5B mentioned later is implemented.

Next, the configuration shown in FIG. 3D may be used in order to decrypt the data frame including the cipher.

It is also possible, though not shown in FIG. 3D as with the above, to use a decryption determining portion for identifying whether or not the data frame is encrypted. The decryption determining portion identifies the encrypted data area, and the identified data area is XORed with the keystream for each bit and decrypted. The data areas not encrypted are not XORed.

Thus, the configuration of an entirely plaintext (decrypted) data frame is implemented.

The configuration may be other than the one in the above embodiment as long as it is capable of encrypting and decrypting a predetermined data area.

Here, the encrypting portion 24 first reads the metadata corresponding to the encoded image data to be encrypted from the metadata generating portion 23, and generates the above-mentioned initialization vector I based on the metadata.

Figure 4:
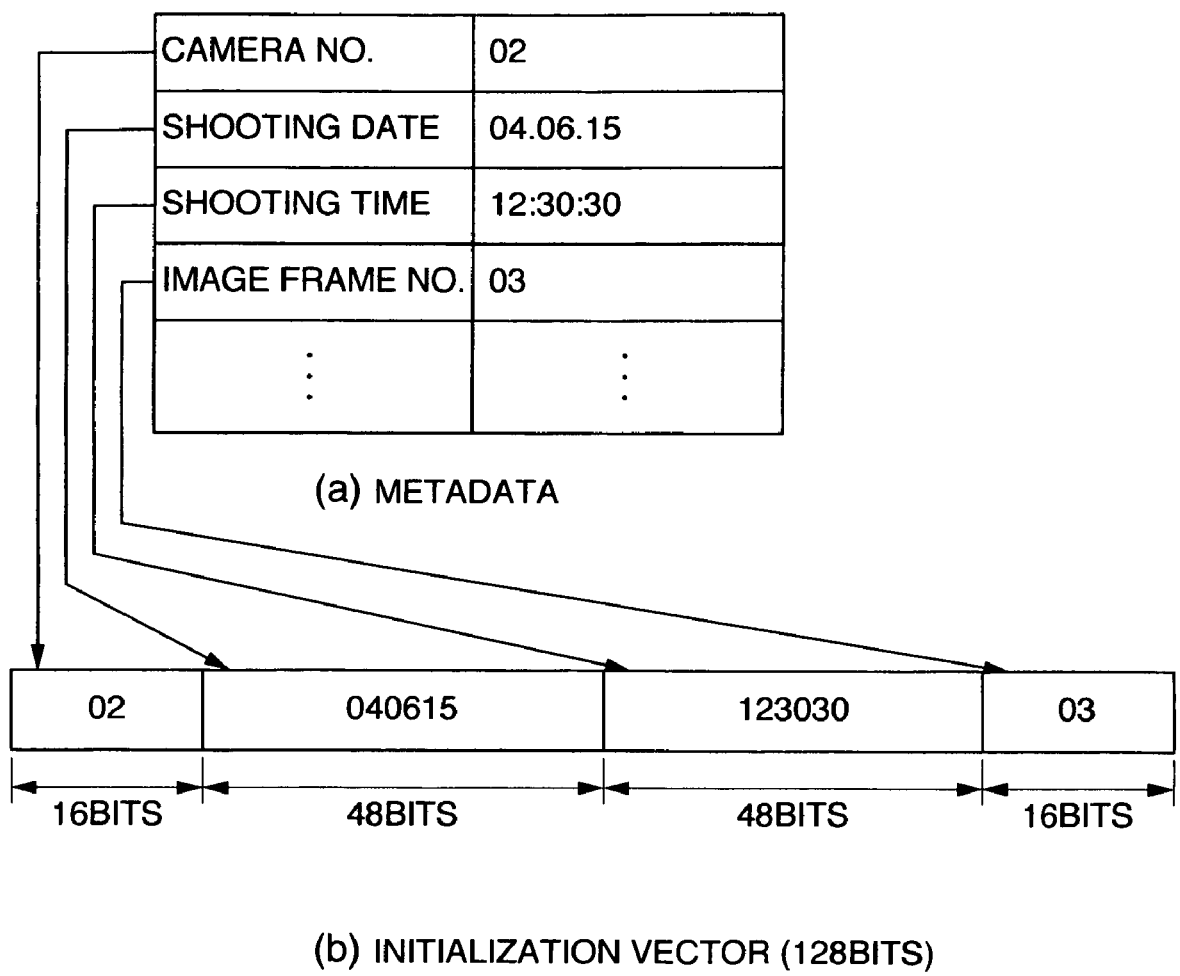
FIG. 4 is a diagram for describing an example of an initialization vector generation method according to an embodiment of the present invention.

For instance, in the case where the metadata of certain encoded image data includes the information of camera number "02," shooting date "04. 06. 14," shooting time "12. 30. 30" and image frame number "03" as shown in FIG. 4 (*a*), the metadata generating portion 23 generates the initialization vector I of 128 bits by taking 16 bits from a camera number field of the metadata (for instance, "0" and "2" of the camera number "02" is represented by 8 bits, which is the same as to the shooting date, shooting time, and image frame number), 48 bits from a field indicating the shooting date, 48 bits from a field indicating the shooting time, and 16 bits from a field indicating the image frame number as shown in FIG. 4 (*b*).

And the encrypting portion 24 generates the keystream from the encryption key K set in advance and the above-mentioned initialization vector I for instance. Here, the generated keystream is uniquely decided by a combination of the keystream K and initialization vector I. Therefore, if the metadata used when generating the initialization vector I is unique, the generated keystream becomes unique and so a danger regarding security of the cipher is avoidable.

The example shown in FIG. 4 is the case of using the information of camera number, shooting date, shooting time and image frame number as the metadata and arranging the information in order of camera number, shooting date, shooting time and image frame number to generate the initialization vector I. However, the method of generating the initialization vector based on the metadata is not limited thereto but various methods may be used. To be more specific, if the initialization vector I is unique to one piece of metadata and a unique keystream is generated, it is free as to how the metadata generating portion 23 uses the metadata to generate the initialization vector I.

The method of generating the initialization vector based on the metadata may be set up as prearranged both at a transmitting end (the encrypting portion 24 of the image encoding apparatus 102 for instance) and a receiving end (a cipher decrypting portion 64 of the image decoding apparatus 105 described later for instance) for instance.

Next, the encrypting portion 24 generates the encrypted encoded image data from an exclusive OR of the encoded image data inputted from the image encoding portion 22 and the keystream generated as described above. Here, many kinds of methods including the MPEG and JPEG are applicable as a compression encoding method of the image encoding portion 22. The present invention is applicable to any method having a data frame configuration capable of embedding the metadata.

Here, a description will be given by referring to FIG. 5 as to the case of the MPEG-4 as an example. In the case of the MPEG-4, each image configuring a VO is called a VOP (Video Object Plane), and a group of the VOP is handled as a GOV (group of VOP).

FIG. 5A schematically shows an overview of a stream configuration of the MPEG-4.

The stream configuration of the MPEG-4 in reality is as provided in the ISO/IEC 14496-2. To schematically show an overview thereof, as shown in FIG. 5A, the encoded image data of the MPEG-4 is configured by a VO (Video Object) header information area starting from a video object start code, a VOL (Video Object Layer) header information area starting from a video object layer start code, a GOV (Group of VOP) header information area starting from a group vop start code, a user data area usable for a user in accordance with an application and starting from a user data start code, and a VOP starting from a vop start code (called a VOP code here).

The VOP is configured by the VOP code, the information necessary to decode the entire VOP (VOP header) and MB (Macro Block) encoding information which is encoding information on an image body equivalent to a frame. As shown in FIG. 5A, multiple VOPs follow the user data area.

FIG. 5B shows the position for performing the encryption in the encryption process according to an embodiment of the present invention out of the encoded image data of the MPEG-4. As shown in FIG. 5B, the encrypting portion 24 only performs the encryption to the MB encoding information out of the encoded image data of the MPEG-4.

Figure 5C:
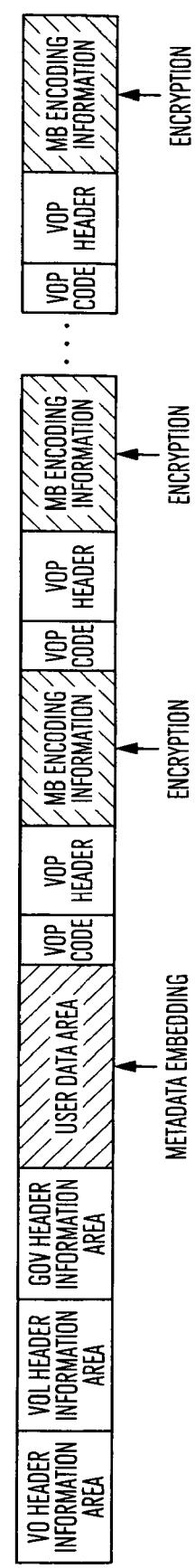
FIG. 5C is a diagram showing an example of a position for embedding metadata in a configuration example of encoded image data according to an embodiment of the present invention.

FIG. 5C shows the position for embedding the metadata used in the encryption process according to an embodiment of the present invention out of the encoded image data of the MPEG-4.

The encrypting portion 24 generates for each GOV the initialization vector I based on the metadata corresponding to the GOV to encrypt the MB encoding information. As shown in FIG. 5C, it embeds the metadata used for generation of the initialization vector I in the user data area of the GOV of the MPEG-4 stream, and then outputs the encrypted encoded image data to the network interface portion 25.

Figure 6:
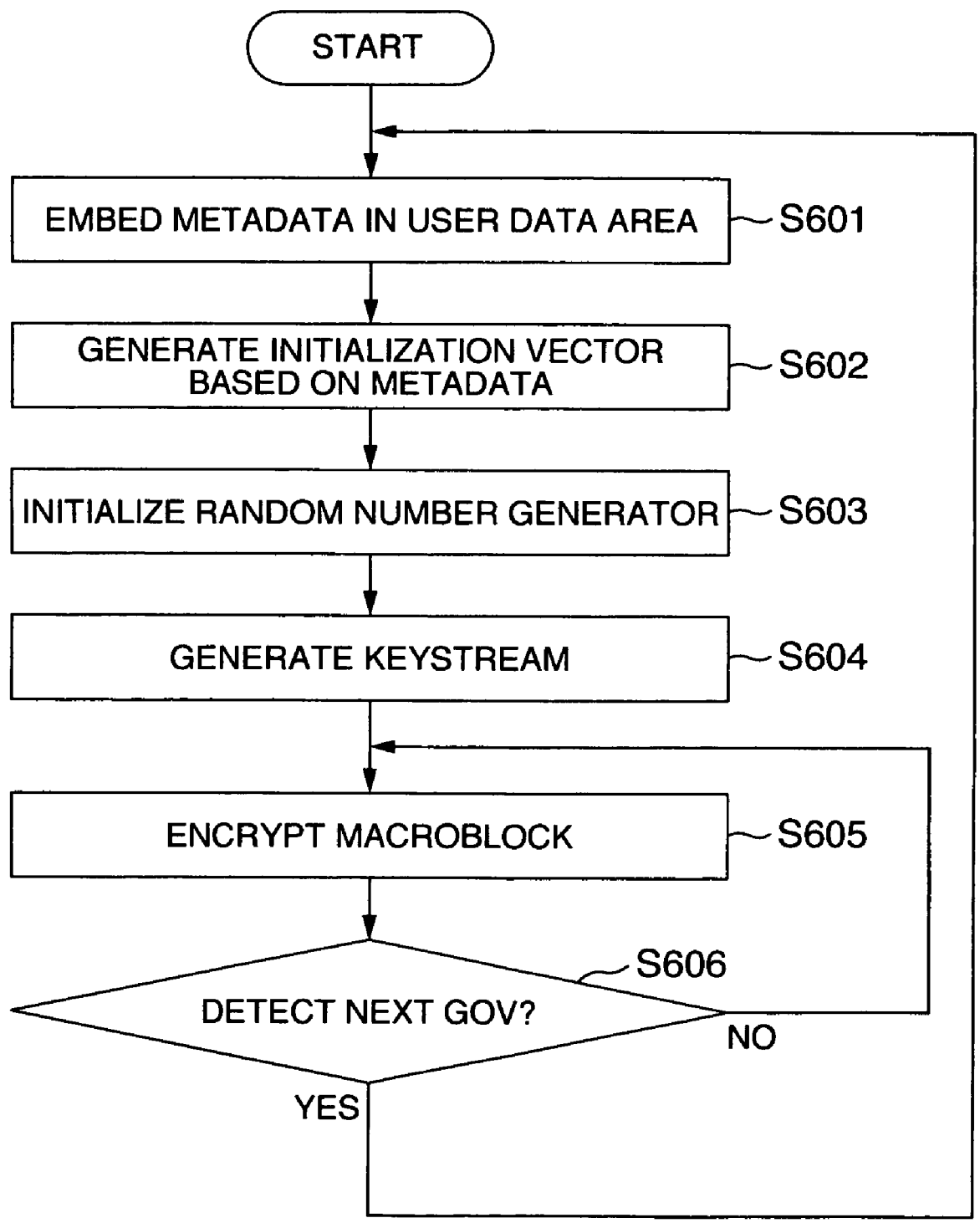
FIG. 6 is a diagram for describing an example of a procedure for an encryption process of the encoded image data according to an embodiment of the present invention.

FIG. 6 shows an example of a procedure for encrypting the encoded image data of the MPEG-4 according to an embodiment of the present invention.

First, on detecting a new GOV, the encrypting portion 24 reads the metadata corresponding to the GOV from the metadata generating portion 23 and embeds the read metadata in the user data area of the GOV (step S601).

Next, the encrypting portion 24 generates an initialization vector I-1 (first initialization vector I) based on the metadata read from the metadata generating portion 23 (step S602).

The method of generating the initialization vector is as described above. In the case of the encoded image data of the MPEG-4, the frame number and time stamp corresponding to the VOP at the head of the GOV (the youngest frame number or oldest time stamp of the VOPs configuring the GOV) are used out of the metadata.

Next, the encrypting portion 24 initializes the random number generator (step S603), and generates the keystream from the initialization vector I-1 and the preset encryption key K (step S604). And it performs the encryption by the exclusive OR of the generated keystream and MB encoding information on the MPEG-4 encoded image data (step S605). Thereafter, the encrypting portion 24 repeatedly encrypts the MB encoding information with the generated keystream (NO in the step S606) until detecting a next GOV (until detecting a next video object start code for instance).

Here, in the case where the VOP code is detected for instance, it is possible to encrypt only the MB encoding information by skipping the encryption up to the position of the next MB encoding information.

In the case where the next GOV is detected (YES in the step S606), the encrypting portion 24 reads the metadata corresponding to the GOV from the metadata generating portion 23 as with the above, generates an initialization vector I-2 based on the read metadata and uses a new keystream generated by using the initialization vector I-2 so as to encrypt the MB encoding information on the GOV thereafter (steps S601 to S605).

Hereunder, in the case where the next GOV is further detected, the encrypting portion 24 generates an initialization vector I-n (n=3, 4, 5 . . . ) and performs the same encryption process as above.

Thus, according to the procedure shown in FIG. 6, the initialization vector I is updated for each GOV, and the random number generator is also initialized for each GOV, that is, that is, for multiple frames of the images each time.

According to the procedure shown in FIG. 6, the metadata is embedded in the encoded image data in the step S601 before performing the encryption in the step S605. However, timing for embedding the metadata is not limited to the above-mentioned timing, various timing such as embedding the metadata after performing the encryption may be used for instance.

Next, the image storage distribution apparatus 104 will be described. The image storage distribution apparatus 104 stores the encoded image data (encryption data) encrypted in a format shown in FIG. 5C, and distributes the encryption data via the network 103 as required according to a request from a client.

As described above, in the case of the encoded image data of the MPEG-4, only the MB encoding information is encrypted, and no encryption is performed as to the information necessary for a search and distribution of the images, such as a VO header information area, a VOL header information area, a GOV header information area, a VOP code and a VOP header. Therefore, the image storage distribution apparatus 104 can equally handle the encryption data and non-encryption data.

For this reason, an encryption camera and a non-encryption camera can coexist in the same system, such as performing the encryption to the image data of a certain camera 101 and performing no encryption to the image data of another camera 101.

As described above, no encryption is performed to the user data area in which the metadata is embedded according to this embodiment. Therefore, if the configuration for embedding the metadata in the user data area is used likewise as to the non-encryption data, the metadata becomes commonly usable to both the encryption data and non-encryption data for the sake of searching the images and so on.

Thus, it is possible for the clients (decoding apparatus, data terminal and so on) to search for the encryption data and non-encryption data at once for instance. The searched encryption data can be decoded by using the decoding apparatus as required. In other words, an apparatus (or a user) having no decoding key can search for the encryption data but cannot see the decoded data.

While the above showed the configuration for encrypting only the MB encoding information, it is also possible to appropriately encrypt the information other than the information necessary for the search or delivery of the images including the VOP header.

Figure 7:
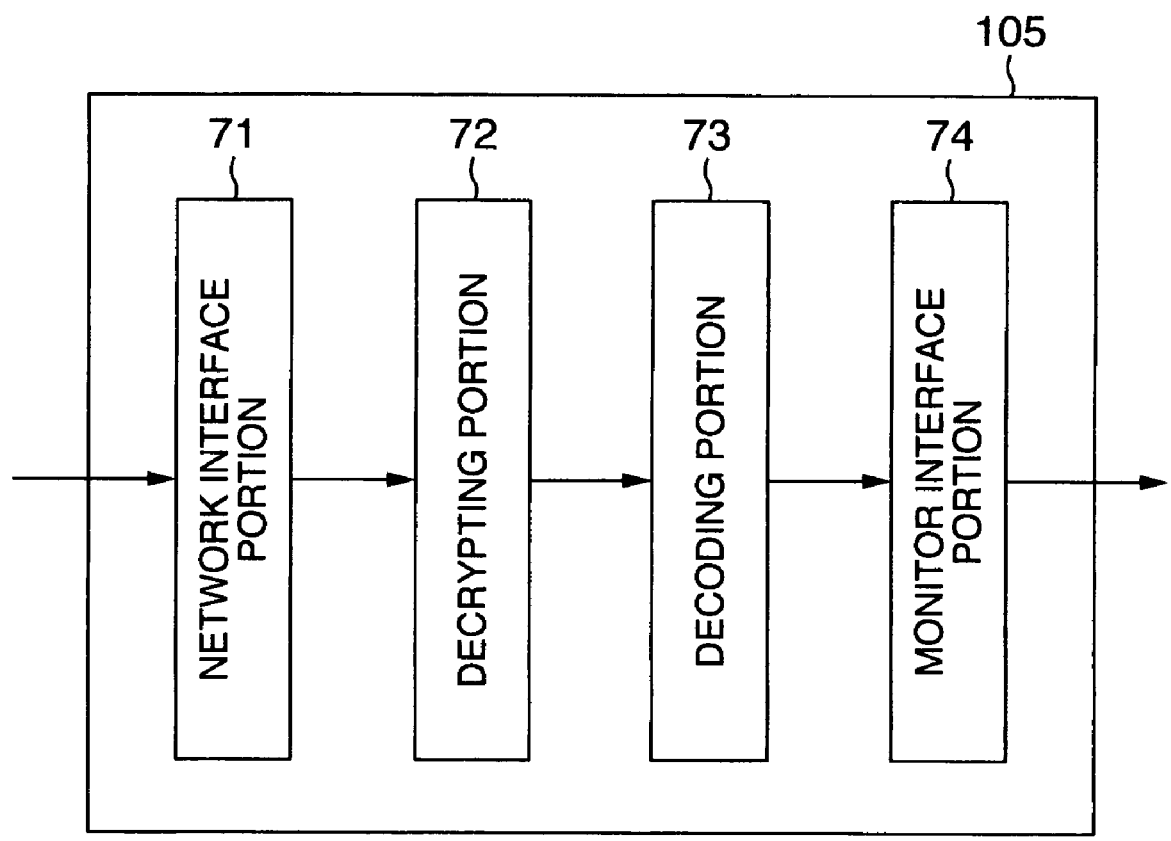
FIG. 7 is a diagram showing a configuration example of an image decoding apparatus according to an embodiment of the present invention.

Next, the image decoding apparatus 105 will be described. FIG. 7 shows a configuration example of the image decoding apparatus according to an embodiment of the present invention.

The image decoding apparatus 105 shown in FIG. 7 is configured by a network interface portion 71, a cipher decrypting portion 72, an image decoding portion 73 and a monitor interface portion 74.

The network interface portion 71 receives the encrypted encoded image data from the network 103, and outputs the received encrypted encoded image data to the cipher decrypting portion 72.

The cipher decrypting portion 72 decrypts the cipher of the encrypted encoded image data, and outputs the encoded image data to the image decoding portion 73.

The image decoding portion 73 decodes the encoded image data, and outputs the decoded image data to the monitor interface portion 74.

The monitor interface portion 74 outputs the encoded image data to the monitor 106. As the image decoding apparatus 105 operates as above, the encrypted encoded image data is decrypted and decoded so that the images of the decrypted cipher and decoded image are displayed or reproduced on the monitor 106.

Here, an example of the operation of the cipher decrypting portion 72 is shown by exemplifying the case of the encoded image data of the MPEG-4.

On receiving the encoded image data encrypted in the format shown in FIG. 5C from the network interface portion 71, the cipher decrypting portion 72 performs a decryption process of the cipher. To be more specific, on detecting the GOV of the encrypted encoded image data, the cipher decrypting portion 72 extracts the metadata embedded in the user data area.

As with the above-mentioned process of the encrypting portion 24 of an image encoding apparatus 27, the cipher decrypting portion 72 generates the initialization vector I based on the extracted metadata, initializes the random number generator and then generates the keystream from the initialization vector I and the preset encryption key K as shown in FIG. 3D.

And contrary to the above-mentioned encryption process, it decrypts the cipher of the MB encoding information by the exclusive OR of the generated keystream and the encrypted MB encoding information.

Thereafter, the cipher decrypting portion 72 decrypts the cipher of the encrypted MB encoding information with the generated keystream until detecting a next GOV. In the case where the next GOV is detected, the cipher decrypting portion 72 newly extracts the metadata in the user data area of the GOV, generates the initialization vector from the metadata as above and generates the keystream so as to decrypt the encrypted MB encoding information thereafter.

As for the image delivery system according to this embodiment, it is necessary to share the encryption key K between the image encoding apparatus 102 and the image decoding apparatus 105. In this case, it is possible to share the encryption key K by a conventionally known method, such as a method of presetting the encryption key K on system shipment or having the encryption key K set by a system administrator on system operation for instance.

As for updating of the encryption key K, if the initialization vector is 128 bits as above, the same keystream is not generated during product life under normal circumstances, and so it is not necessary in particular to change the encryption key K set at the beginning. However, it is also possible for the system administrator to set a new encryption key K as required.

As for the system configured by multiple image encoding apparatuses 102 and multiple image decoding apparatuses 105, it is also possible to share one encryption key K inside the system by generating a unique initial vector to avoid generation of the same keystream so as not to render the security of the cipher vulnerable.

As described above, as to the image delivery system according to this embodiment, the image encoding apparatus 102 includes a unit for encoding the input image from the camera 101, a unit for generating the metadata corresponding to the encoded image data and a unit for encrypting the encoded image data. The unit for encrypting the encoded image data generates the initialization vector based on the metadata corresponding to the encoded image data to be encrypted, generates the keystream from the encryption key and the initialization vector and encrypts the encoded image data with the keystream.

The unit for encrypting the encoded image data updates the initialization vector used to generate the keystream and initializes the random number generator in units of an image (multiple frames of the image for instance).

Therefore, the image delivery system according to this embodiment initializes the random number generator in units of an image (in units of 1VOP for instance) so as to allow return of cryptographic synchronization in units of an image even if a packet loss occurs on a transmission channel.

It is also possible, by including the camera number, shooting date and time and image frame number in the metadata in the initialization vector for instance, to generate a unique keystream in the system so as to avoid reuse of the keystream without updating the encryption key.

Thus, it is possible to avoid compromising the security of the cipher due to the reuse of the keystream. In general, a data length in units of an image is longer than that of the packet. Therefore, updating frequency of the initialization vector becomes lower than the conventional examples so that overhead of the encryption and decryption in conjunction with the updating of the initialization vector can be reduced.

The image delivery system according to this embodiment can generate the unique keystream in the system with the initialization vector updated in units of an image. Therefore, it is allowed to share one encryption key in the system so that the system can be constructed by one encryption key requiring no updating. Thus, it is expected to reduce system development costs.

The system has simplified its key management, such as a setup of the encryption key and key distribution in conjunction with updating of the encryption key, and the load of the key management is alleviated for the user so as to provide a user-friendly system.

The encryption method according to this embodiment is also applicable to a multi-encoder supporting multiple kinds of codec including MPEG compression, JPEG compression and speech compression. In this case, it is possible, by setting the initialization vector of each codec to a unique value based on the metadata, to generate a unique keystream for each codec while using the same encryption key.

The image storage distribution apparatus 104 of the image delivery system according to this embodiment can store the encrypted image data and metadata outputted from the image encoding apparatus 102 and renders the information in the metadata as a search key on a search for the encrypted image data so as to search for and distribute the encrypted image data in an encrypted state.

The image storage distribution apparatus 104 can equally handle the encryption data and non-encryption data, and so the encryption camera and non-encryption camera can coexist in the same system.

The image delivery system according to this embodiment can derive the initialization vector from stream data. Therefore, an overhead bit for the initialization vector due to the encryption is no longer necessary and bands of the system can be efficiently used.

As the encryption is performed in an application layer, a change in a lower layer in conjunction with the encryption is not necessary, and header compression to the packet is also applicable.

As it exerts no influence upon an existing system, the system can be easily introduced.

The image decoding apparatus 105 of the image delivery system according to this embodiment generates the keystream by using the metadata embedded in the received encrypted encoded image data. Therefore, in the case where the metadata is tampered with during transmission, the cipher is not correctly decrypted. To be more specific, the metadata is reliable if a reproduced image has no abnormality, and so it has the effect of checking tampering at a glance.

This embodiment shows the configuration in which, on encrypting the MB encoding information of each GOV as to the encoded image data of the MPEG-4, the initialization vector is generated based on the metadata of the GOV. It is also possible, as another configuration example, to have the configuration in which the initialization vector is generated based on a GOV before or after the GOV.

In the case of the configuration in which the initialization vector is generated based on the metadata of each GOV itself, that is, in the case of the configuration in which the encryption process is independently performed in units of an image frame, it has the effect of, even on occurrence of the packet loss on the transmission channel, suppressing the influence of the packet loss on decrypting the cipher at the receiving end to a minimum.

Here, this embodiment shows the configuration in which, in the case of encrypting the encoded image data of the MPEG-4, the encryption is performed by updating the initialization vector for each GOV. It is also possible, as another configuration example, to have the configuration in which the encryption is performed by updating the initialization vector for each VOP. Next, this will be described by referring to FIGS. 8 to 10.

Figure 8:
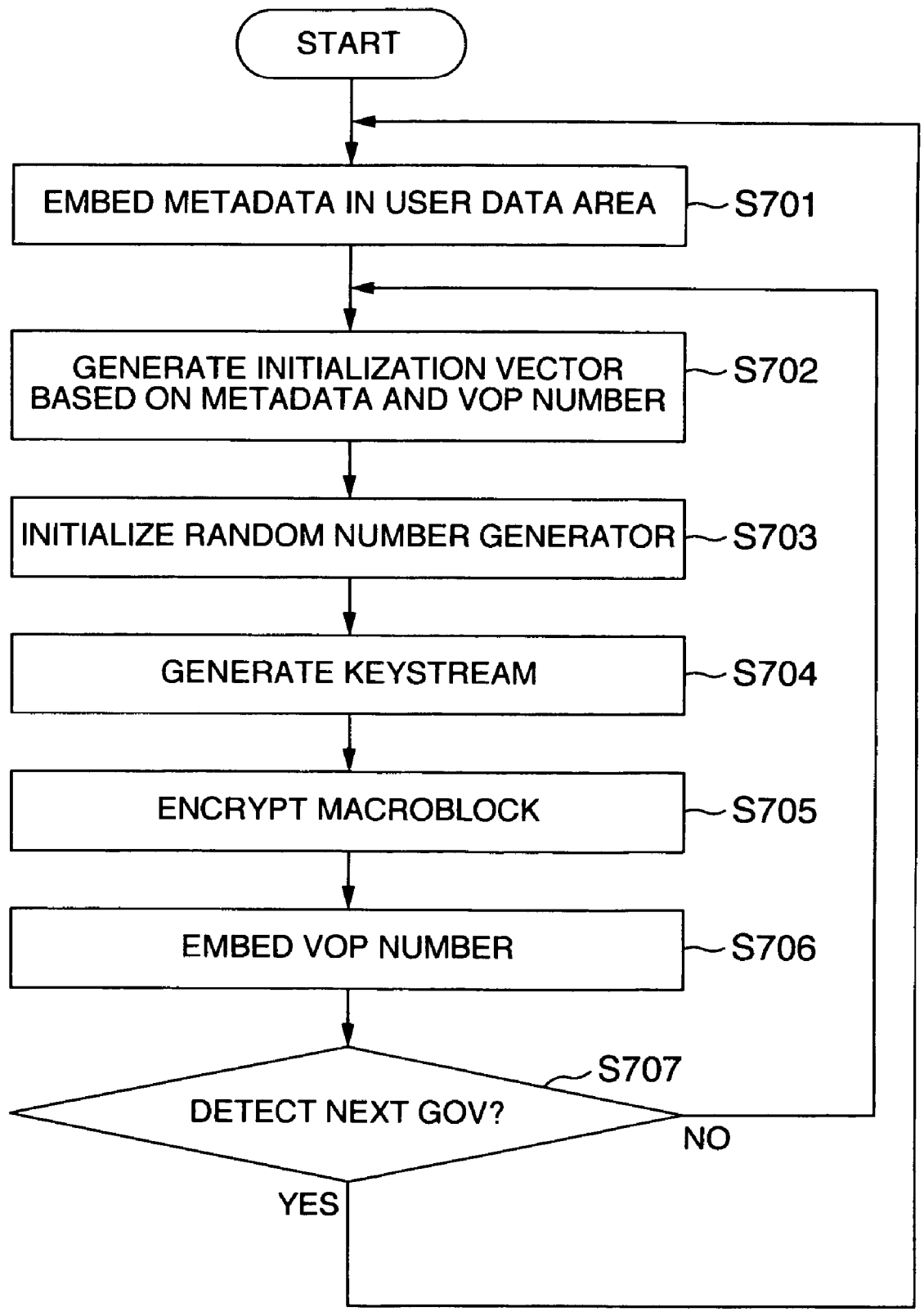
FIG. 8 is a diagram for describing an example of a procedure for the encryption process of the encoded image data according to an embodiment of the present invention.

FIG. 8 shows an example of the procedure for encrypting the encoded image data of the MPEG-4 by updating the initialization vector for each VOP according to an embodiment of the present invention.

To be more specific, once a new GOV is detected, the encrypting portion 24 reads the metadata corresponding to the GOV from the metadata generating portion 23 so as to embed the read metadata in the user data area of the GOV (step S701).

Figure 9:
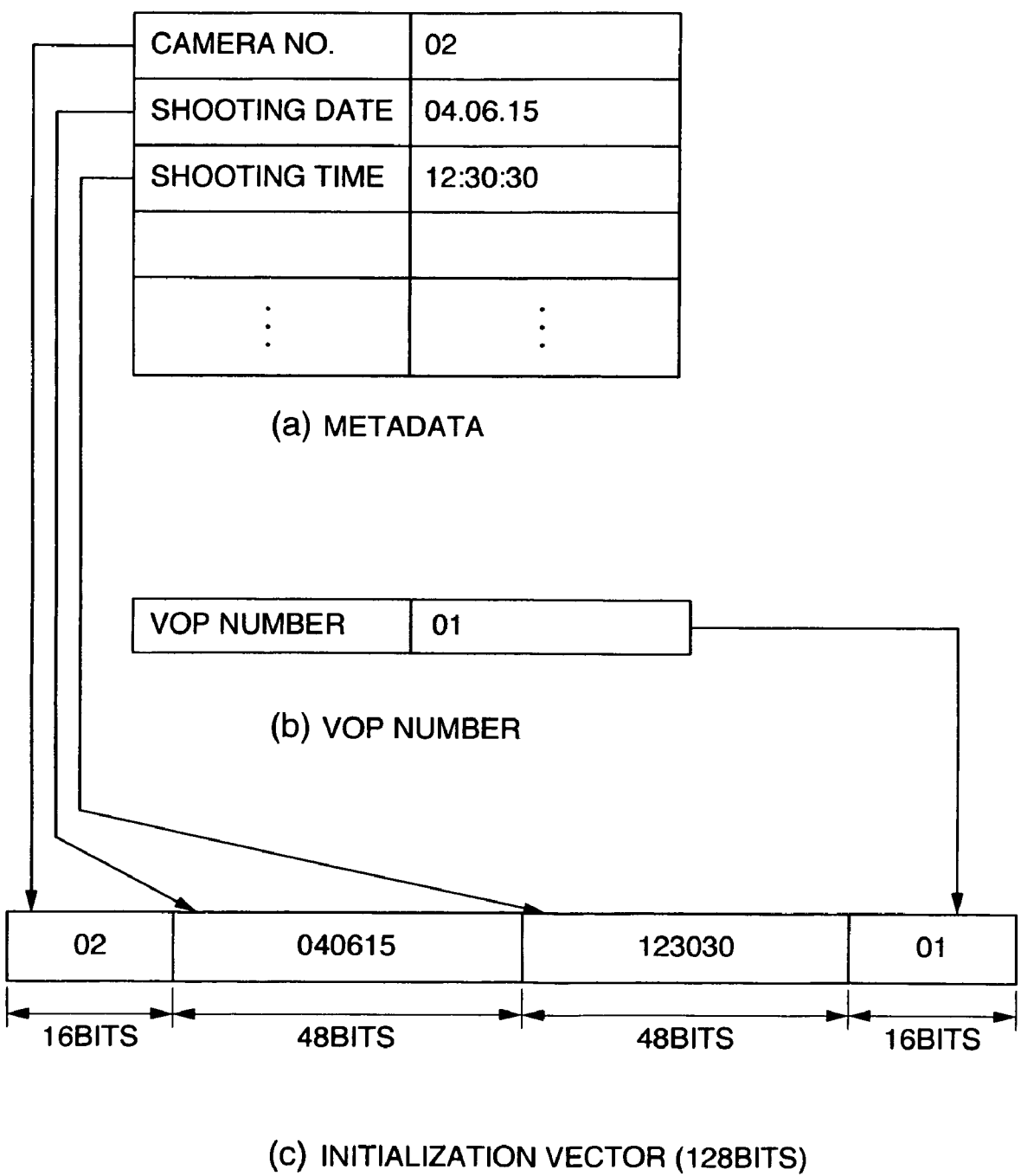
FIG. 9 is a diagram for describing an example of a method of generating an initialization vector according to an embodiment of the present invention.

Next, as shown in FIG. 9, the encrypting portion 24 generates the initialization vector I as shown in FIG. 9 (c) from the metadata such as the camera number and shooting date (FIG. 9 (a)) and VOP numbers given correspondingly to the VOPs (FIG. 9 (b)) (step S702).

The VOP numbers are a kind of metadata, which may be generated either by the metadata generating portion 23 or by having the number of VOPs counted by the encrypting portion 24.

Next, the encrypting portion 24 initializes the random number generator (step S703), and generates the keystream from the initialization vector I and the preset encryption key K (step S704).

Figure 10:
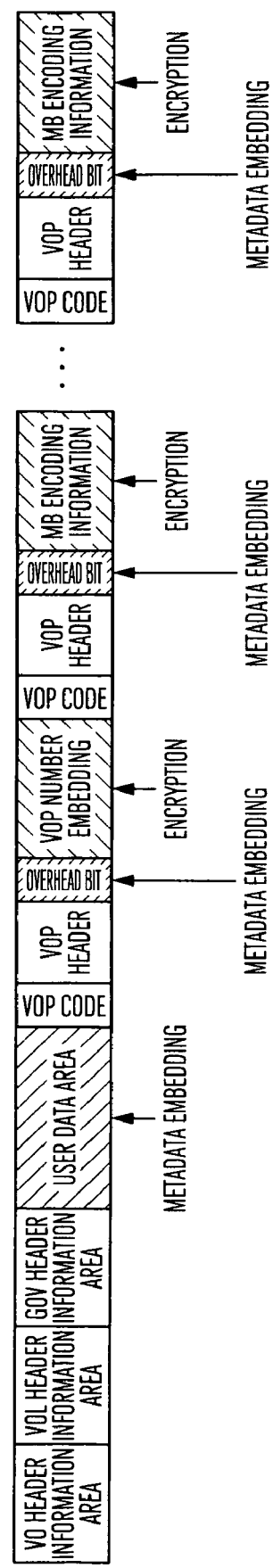
FIG. 10 is a diagram showing a configuration example of the encoded image data according to an embodiment of the present invention.

And it performs the encryption by the exclusive OR of the generated keystream and MB encoding information on the VOP corresponding to the VOP number (step S705). As shown in FIG. 10, the VOP number is embedded as the overhead bit immediately after the VOP header (step S706).

The position for embedding the VOP number is not limited to immediately after the VOP header. The position for embedding the VOP number may be set up as prearranged both at the transmitting end and receiving end, such as a 1-byte area after the VOP header for instance.

As will be described later, the VOP number needs to be used on decrypting the cipher of each VOP at the receiving end, and so the VOP number to be embedded in the stream is not encrypted.

In the case where the next GOV is not detected thereafter (NO in the step S707), the encrypting portion 24 generates the initialization vector I for each VOP from the VOP number associated with the VOP (the number increased by 1 from the number of a preceding VOP) and the metadata, initializes the random number generator and generates the keystream from the initialization vector I and the preset encryption key K so as to repeatedly encrypt the MB encoding information on the VOP, etc. corresponding to the VOP number with the generated keystream and embeds the VOP number (steps S702 to S706).

In the case where the next GOV is detected (YES in the step S707), the encrypting portion 24 reads the metadata corresponding to the GOV from the metadata generating portion 23 as with the above and performs the encryption process likewise while updating the initialization vector I for each VOP from the VOP number associated with the VOP and the metadata.

This embodiment shows the configuration in which the VOP number is used to generate the initialization vector I in order to avoid the reuse of the keystream used for the encryption of the preceding VOP by generating a unique initialization vector I for each VOP. It is also possible, however, to have the configuration for generating a unique initialization vector I for each VOP by other various methods, such as using the information other than the VOP number or changing a sequence of the metadata on generating the initialization vector I.

It is also possible, for instance, to have the configuration for generating a unique initialization vector I for each VOP based on unique information on each VOP included in the VOP other than the configuration for embedding the VOP number as the overhead bit in the stream of the MPEG-4.

Next, a description will be given as to an example of operation of the image decoding apparatus 105 having received the encoded image data of the MPEG-4 in which the initialization vector is updated and the encryption is performed for each VOP.

The cipher decrypting portion 72 of the image decoding apparatus 105 performs the cipher decryption process upon receiving the encoded image data encrypted in the format shown in FIG. 10 from the network interface portion 71. To be more specific, the cipher decrypting portion 72 extracts the metadata embedded in the user data area upon detecting the GOV of the encrypted encoded image data.

Upon detecting the VOP code, the cipher decrypting portion 72 extracts the VOP number embedded as the overhead bit immediately after the VOP header.

As with the process of the encrypting portion 24, the cipher decrypting portion 72 generates the initialization vector I-1 based on the extracted metadata and VOP number, initializes the random number generator and then generates the keystream from the initialization vector I-1 and the preset encryption key K.

And contrary to the above-mentioned encryption process, it decrypts the cipher of the MB encoding information by the exclusive OR of the generated keystream and the encrypted MB encoding information.

Thereafter, on detecting the next VOP code, the cipher decrypting portion 72 extracts the VOP number embedded as the overhead bit immediately after the VOP header and generates the initialization vector I-2 based on the metadata and VOP number.

After initializing the random number generator, it generates the keystream from the initialization vector I-2 and the preset encryption key K, and decrypts the cipher of the encrypted MB encoding information with the generated keystream.

In the case where the next GOV is detected, it newly extracts the metadata in the user data area of the GOV and decrypts the cipher while updating the initialization vector I for each VOP by using the VOP number as above.

Thus, according to the procedure shown in FIG. 8, the random number generator is initialized for each VOP, that is, for each frame of the image. Therefore, even if the packet loss occurs on the network 103 and the random number generators of the transmitting end and receiving end go out of synchronization, it is possible to synchronize the random number generators from the decryption of the next VOP so as to allow the return of cryptographic synchronization in units of an image frame.

In this case, the initialization vector I is updated to a unique value for each VOP so that a unique keystream can be constantly used to avoid the reuse of the same keystream.

It is also possible, as another configuration, to use the configuration for initializing the random number generator in units of a VOP and updating the initialization vector I in units of a GOV. In that case, the random number generator is initialized without updating the initialization vector I, and so it goes without saying that the same keystream is generated and the security of the cipher is compromised.

In this example, the VOP number is inserted into the stream as the overhead bit, and so data transmission efficiency lowers by just that much. However, the receiving end can extract the VOP number embedded in the stream and use it for decryption of the cipher. Therefore, the VOP numbers do not go out of synchronization at the transmitting end and receiving end even if the packet loss occurs on the network 103, and it is possible to correctly perform the decryption of the cipher all the time.

Next, a description will be given by referring to FIGS. 11A to 11C as to an example of the configuration for encrypting the encoded image data of the JPEG.

As shown in FIG. 11A, the encoded image data of the JPEG is configured by a marker segment consisting of single markers such as an SOI (Start of Image) and an EOI (End of Image), markers such as an APP0 (Application type0), an SOF0 (Start of Frame type0) and SOS (Start of Scan) and additional information and an encoding segment as the image body.

Here, as shown in FIG. 11B, the encrypting portion 24 encrypts only the encoding segment out of the encoded image data of the JPEG. To be more specific, once the SOI is detected, the encrypting portion 24 reads the metadata corresponding to the image frame from the metadata generating portion 23, generates the initialization vector I based on the metadata and initializes the random number generator, and then generates the keystream from the initialization vector I and the preset encryption key K.

And the encrypting portion 24 performs the encryption by the exclusive OR of the generated keystream and the encoding segment. In the case where a next SOI is detected, the encrypting portion 24 reads the corresponding metadata from the metadata generating portion 23 likewise, generates the initialization vector I based on the metadata and encrypts the encoding segment with a new keystream.

In the case where another marker is detected between the SOI of a certain image frame and the SOI of the next image frame, the encrypting portion 24 can encrypt only the encoding segment by skipping the encryption up to the position of the next encoding segment.

And as shown in FIG. 11C, the encrypting portion 24 embeds the metadata used for the encryption in the APP0 marker segment of a JPEG image and outputs it to the network interface portion 25.

On receiving the encoded image data encrypted in the format shown in FIG. 11C, the image decoding apparatus 105 extracts the metadata embedded in the APP0 marker segment and generates the initialization vector I based on the metadata.

The image decoding apparatus 105 generates the keystream from the initialization vector I and the preset encryption key K, and decrypts the cipher by the exclusive OR of the keystream and the encrypted encoding segment contrary to the above-mentioned encryption process.

The above-mentioned configuration is on the assumption that the initialization vector I is updated and the random number generator is initialized for each frame of the JPEG image. However, it is also possible, on encrypting the encoded image data of the JPEG, to update the initialization vector I and initialize the random number generator for every multiple frames, such as every five frames for instance.

In this case, it is possible, in the above-mentioned configuration, to either generate the initialization vector I based on the metadata corresponding to a lead frame of the five frames for instance or generate the initialization vector I by combining the metadata of the five frames for instance.

Here, this embodiment shows the configuration for encrypting the encoded image data in the MPEG-4 format or the JPEG format. However, it is also possible, as another configuration example, to apply the same configuration and operation as above to the encryption of the image data in another encoding format.

It is also possible to apply the same configuration and operation as above to the encryption of stream data other than the image data such as the voice data.

The image encoding apparatus 102 of this embodiment has a random number generating portion configured by the function of the encrypting portion 24, an input parameter generating portion configured by the functions of the metadata generating portion 23 and encrypting portion 24, a metadata embedding portion configured by the function of the encrypting portion 24, and the encrypting portion configured by the function of the encrypting portion 24.

The image decoding apparatus 105 of this embodiment has the random number generating portion configured by the function of the cipher decrypting portion 72, a metadata extracting portion configured by the function of the cipher decrypting portion 72, the input parameter generating portion configured by the function of the cipher decrypting portion 72, and a decrypting portion configured by the function of the cipher decrypting portion 72.

Here, the configurations of the image delivery system, image encoding apparatus and image decoding apparatus according to the present invention are not always limited to those indicated above but various configurations may be used.

The present invention may also be provided, for instance, as a method or a system for executing the processes relating to the present invention, a program for implementing such method or a system or a recording medium for recording the program, or may also be provided as various apparatuses and systems.

The present invention is not only applicable to the above fields but may also be applied to various fields. As for its applications, it may also be implemented as a system for viewing an athletic contest of a kindergarten or sports such as baseball for instance in addition to a monitoring purpose.

As for various processes performed in the image delivery system, image encoding apparatus and image decoding apparatus according to the present invention, it is possible, for instance, to use the configuration in which a hardware resource having a processor and a memory is controlled by having a control program stored in a ROM (Read Only Memory) executed by the processor. It is also possible to configure each function portion for executing the process as an independent hardware circuit.

It is also possible to grasp the present invention as a computer-readable recording medium such as a floppy disk or a CD (Compact Disc)-ROM storing the control program or the program (itself), where the control program can be inputted to a computer from the recording medium and executed by the processor so as to implement the process according to the present invention. The above description has been made for the embodiments. However, it is apparent to those skilled in the art that the present invention is not limited thereto but various changes and corrections can be made thereto within the bounds of the spirit of the present invention and attached claims.

The invention claimed is:

1. An encryption method for encrypting data including headers comprising the steps of:
    configuring a processor to perform;
    generating an initialization vector based on embedded metadata of the data to be encrypted;
    generating the input parameter consisted of the initialization vector derived from said metadata and an encryption key;
    generating a random number sequence uniquely defined from said input parameter;
    encrypting the data except the header and the metadata by said generated random number sequence; and
    updating said input parameter per a unit or multiple units of the data to be encrypted, so that the random number sequence is initiated; and
    transmitting encrypted data based on said metadata to a client device.

2. The encryption method according to claim 1, further comprising the step of:
    embedding the metadata in the data to be encrypted or encrypted data to be encrypted; and
    wherein, in the case of decrypting the encrypted data to be encrypted, the input parameter is generated based on the embedded metadata.

3. The encryption method according to claim 2, wherein:
    the initialization vector is generated based on the metadata; and
    the encryption key is not updated from the one set in advance.

4. The encryption method according to claim 3, wherein the data to be encrypted is a coded image data; the metadata has at least one of an ID for camera which generates the coded image data, alarm information received from a sensor disposed in an image pick-up area of the camera, a time stamp of the coded image data and a frame number of the coded image data.

5. The encryption method according to claim 4, wherein the coded image data is a MPEG stream and the metadata as a user data is embedded after a GOV head of the MPEG stream or before a VOP of the MPEG stream.

6. The encryption method according to claim 4, wherein the step of encrypting is executed in an application layer and the encrypted data is transmitted by using a layer which is a lower layer than the application layer and which applies a header compression of a packet of the header.

7. A method of searching for the data encrypted by the encryption method according to claim 2, comprising the step of:
    searching for said encrypted data based on the embedded metadata.

8. A data delivery system for encrypting data to be encrypted with a transmitting apparatus and decrypting it with a plurality of receiving apparatus, wherein:
    the transmitting apparatus comprises:
    a random number generating unit for generating a random number sequence uniquely defined from an input parameter;
    an input parameter generating unit for generating an input parameter based on metadata of the data to be encrypted and an encryption key;
    a metadata embedding unit for embedding the metadata into the data to be encrypted or encrypted data to be encrypted for each unit or multiple units of the data; and an encrypting unit for encrypting a data body except a header and the metadata of the data to be encrypted by using the random number sequence generated by the random number generating unit; and a transmission unit for transmitting encrypted data based on identified said metadata to a client device, and the receiving apparatus comprises:

the random number generating unit;

a metadata extracting unit for extracting the metadata from the encrypted data to be encrypted;

an input parameter generating unit for generating the input parameter based on the metadata extracted by the metadata extracting unit and the encryption key; and a decrypting unit for decrypting the data body except the header and the metadata of the encrypted data to be encrypted by using the random number sequence generated by the random number generating unit.

9. The data delivery system according to claim 8, wherein:

the input parameter is updated and the random number generating unit is initialized per said unit or multiple units of the data.

10. An encryption apparatus for encrypting data including headers, comprising:

an input parameter generating unit for generating an input parameter based on metadata of the data to be encrypted and an encryption key;

a random number generating unit for generating a random number sequence uniquely determined from said input parameter;

a metadata embedding unit for embedding the metadata in the data to be encrypted or the encrypted data to be encrypted; and an encrypting unit for encrypting a data body except a header and the metadata of the data to be encrypted by using said random number sequence generated by said random number generating unit; and transmitting encrypted data based on identified said metadata to a client device.

11. The encryption apparatus according to claim 10, wherein:

the parameter is updated and the random number generating unit is initialized per the unit or multiple units of the data.

12. A data storage distribution apparatus for distributing a video stream which is partially encrypted, comprising:

an input parameter generating unit for generating input parameters consisted of an initialization vector and an encryption key for each unit of the video stream, the initialization vector is unique and delivered from metadata regarding the video stream;

a random number generating unit for generating a random number sequence uniquely defined from said input parameter;

an encrypting unit for encrypting the video stream except the header and the metadata by said generated random number sequence;

a storage means for storing said encrypted video stream with the metadata, a network interface for transmitting said encrypted video stream in which the metadata is embedded; and a searching means for searching the encrypted video stream of desired conditions is based on the metadata according to a search request from a client so that the network interface transmits the encryption data meeting the search request to the client.

* * * * *